United States Patent

[11] 3,615,487

| [72] | Inventors | Roland Moraw<br>Wiesbaden-Biebrich;<br>Renate Schulz, Wiesbaden, both of<br>Germany |
|---|---|---|
| [21] | Appl. No. | 883,337 |
| [22] | Filed | Dec. 8, 1969 |
| [45] | Patented | Oct. 26, 1971 |
| [73] | Assignee | Keuffel & Esser Company<br>Morristown, N.J. |
| [32] | Priority | Dec. 10, 1968 |
| [33] | | Germany |
| [31] | | P 18 13 713.8 |

[54] METHOD FOR THE PRODUCTION OF DIAZO-TYPE INTERMEDIATE ORIGINALS
5 Claims, No Drawings

[52] U.S. Cl............................................. 96/49, 96/91
[51] Int. Cl........................................... G03c 5/34, G03c 1/58, G03c 1/54
[50] Field of Search............................ 96/49, 91, 75

[56] References Cited
UNITED STATES PATENTS

| 1,760,780 | 5/1930 | Schmidt et al. | 96/91 |
| 1,906,240 | 5/1933 | Schmidt et al. | 96/91 X |
| 1,967,371 | 7/1934 | Schmidt et al. | 96/91 X |
| 2,245,628 | 6/1941 | Von Poser et al. | 96/91 X |
| 2,246,425 | 6/1941 | Von Poser et al. | 96/91 X |
| 2,418,623 | 4/1947 | Chechak | 96/91 X |
| 2,500,096 | 3/1950 | Slifkin | 96/49 |
| 2,659,672 | 11/1953 | Leuch | 96/91 X |
| 2,793,118 | 5/1957 | Sanders et al. | 96/75 X |
| 3,113,025 | 12/1963 | Bialczak | 96/91 |
| 3,382,070 | 5/1968 | Welch | 96/49 |

*Primary Examiner*—Charles L. Bowers, Jr.
*Attorneys*—J. Russell Juten, Peter F. Willig, Lionel N. White and Milford A. Juten ABSTRACT: Light-sensitive diazo-type material useful in the preparation of intermediate original copies having effective light absorption over a broader wavelength range is prepared by combining P- or o-amino benzene diazonium compounds with azo dye couplers which are enol or phenol compounds having no amino nitrogen on the benzene nucleus, and further including in the light-sensitive composition benzene diazonium compounds having no amino nitrogen on the benzene nucleus or amino phenol azo dye coupler compounds. When diazo-type materials of such composition are exposed and developed in the ordinary manner and are subsequently exposed to strong acids, the resulting images exhibit strong absorption at substantially all of the significant wavelengths of light generated by diazo-type copy device light sources.

METHOD FOR THE PRODUCTION OF DIAZO-TYPE INTERMEDIATE ORIGINALS

BACKGROUND OF THE INVENTION

A diazo-type intermediate original, i.e. a copy from which further diazo-type copies can be made, must exhibit an imagewise contrast in the spectral range in which diazo-type material is light-sensitive and in which the usual reproduction lamps emit. This so-called actinic contrast must be between wavelengths of about 350 nm and 450 nm, i.e. extend from the near ultraviolet to the short-wave visible range.

As dyestuffs for such intermediate originals, there have hitherto been used yellow azo dyestuffs, the light absorption of which usually extends into the near ultraviolet range. The absorption maxima of these dyestuffs are above 400 nm, and the absorption markedly drops below 400 nm. The dyestuffs thus have a relatively poor absorption in the range between about 350 nm and 400 nm, in which are the absorption maxima of most of the usual light-sensitive diazo compounds and in which all such diazo compounds still have a good absorption. This means that, e.g., the radiation of the high-pressure mercury vapor lamps usually used for reproduction purposes is only little absorbed in the range of the very intensive spectral line at 365 nm by the parts of such intermediate originals and, on the other hand, however, considerably contributes to the photolysis of the diazo-type material exposed thereto. The contrast of the copy is decreased thereby.

It has been tried to fill the so-called absorption gap of the intermediate originals around 360 nm. For this purpose, benzene diazonium salts have been used, which contain hydroxy or alkoxy groups in the benzene nucleus but no amino groups and which are visually colorless. These diazo compounds couple with the usual yellow couplers to give azo dyestuffs with a good absorption in the near ultraviolet range, which satisfactorily absorb the reproduction light. The diazo compounds themselves, however, absorb in the ultraviolet range to such an extent that their light-sensitivity in the spectral range of the reproduction lamps is too low. Furthermore, these compounds are thermally very labile. Therefore, they have not found practical use.

One generally compromises in preparing the compositions by considerably increasing the concentration of diazo compound and yellow coupler in diazo-type materials selected for the production of intermediate originals in order to achieve a sufficient actinic contrast. Processing of such materials requires a longer time of exposure to light, of course.

Another disadvantage of this process occurs in its application for diazo microfilm, for example. Such a film generally serves for duplicating microfilm photos on silver halide material. By mixing azo dyestuffs of different colors, one tries to produce a black shade in the diazo microfilm, which approaches that of the silver film as much as possible. The density and gradation values determined in the visible spectral range, which are substantial for viewing such a film, are distinctly different, however, from the corresponding values in the near ultraviolet range, whereas, in the case of silver films, these properties are almost identical in both ranges.

It is known from U.S. Pat. No. 2,500,096, that the shade of blue azo dyestuffs can be displaced to yellow by treatment with acid vapors, particularly with moist sulfur dioxide. This color shade displacement, which is reversible, can be utilized for converting diazo-type copies with a high visible contrast into such with a high actinic contrast and vice versa.

The patent teaches that the production of suitable coupling dyestuffs requires the use of p-amino-benzene-diazonium compounds.

The yellow dyestuffs obtained according to this process, however, do not absorb in a range of shorter waves than do the yellow azo dyestuffs obtained in the usual manner by coupling with yellow components. The patent furthermore does not suggest special measures for obtaining dyestuffs which further absorb in the ultraviolet spectral range. Particularly, the patent does not teach how a contrast can be achieved which is sufficiently high in the visible as well as in the near ultraviolet spectral ranges.

SUMMARY

The purpose of the invention is to provide a process for the production of diazo-type intermediate originals having a high actinic contrast.

This can be achieved by a process for the production of diazo-type intermediate originals in which a diazo-type material containing a light-sensitive amino-benzene-diazonium compound is imagewise exposed to light and developed in the presence of a coupling component, and the resulting copy is treated with an electrophilic reactant.

The process of the invention is characterized in that a diazo-type material is used which contains a benzene diazonium compound with a basic amino group in para or ortho position to the diazo group, and development is performed in the presence of a yellow coupler which is either an enol compound or a phenol compound containing no amino nitrogen atom at the benzene nucleus.

Suitable benzene diazonium compounds with basic amino groups are such light-sensitive diazonium compounds as, in the para or ortho position to the diazonium group, carry a secondary or tertiary amino group containing alkyl, cycloalkyl or aralkyl radicals as substituents. Unsuitable for the purpose of the invention are, for example, compounds with acyl amino groups since their basicity is too low. Also compounds with aryl amino groups are generally not useful. Unsuitable are furthermore benzene diazonium compounds carrying an ether or thioether group instead of a basic amino group as well as quinone diazides.

These facts found by experience show that, in the process of the invention, the solitary electron pair of the basic amino group in the dyestuff molecule is blocked by the electrophilic reactant, e.g. the acid proton, and is thus withdrawn from the mesomeric system of the dyestuff.

In order to achieve sufficient displacement into the ultraviolet range, it is necessary to start from azo dyestuffs already absorbing in the short-wave range, i.e. generally yellow ones. It has been found, however that surprisingly not all yellow couplers usual in the diazo-type field are suitable for the production of azo dyestuffs, of which the absorption can be displaced in the desired manner. Suitable therefor are practically all yellow couplers of the enol type, e.g. acetoacetic acid amides and anilides, benzoylacetic acid amides, cyanoacetic acid amides, pyrazolone derivatives, and the like, as well as phenolic yellow couplers containing no amino nitrogen atom at the benzene ring, e.g. resorcinol and resorcinol derivatives, such as resorcylic acids, resorcylic acid amides, resorcinol monoethers, alkyl resorcinols, halogen resorcinols; alkyl phenols, such as 4-morpholino-methyl-2,5-dimethyl-phenol, 2-hydroxymethyl-phenol, 2,5-dimethyl-6-hydroxymethyl-phenol, and the like.

When using, however, phenols as yellow couplers, which contain an amino group in the benzene nucleus, e.g. m-hydroxy-phenyl-urea, m-acetylamino-phenol, m-dimethylamino-phenol, 2-hydroxy-4-methyl-phenyl-urea, etc., azo dyestuffs are obtained of which the absorption cannot be displaced according to the invention.

This finding bases the embodiment of a further improvement of the process of the invention in that, for development, couplers of the first-mentioned type are combined with those of the second type. Treatment of such an azo dyestuff mixture on the copy with acid results in an absorption displacement with the one portion but not with the other one. The result is a relatively uniform absorption of the image parts of the copy over practically the entire copying range from the near ultraviolet to the short-wave range of the visible spectrum, a property which could hitherto only be achieved with silver films.

Another embodiment consists in that, in the light-sensitive layer, a diazo compound containing a basic amino group is combined with one containing no amino group in the nucleus. By combination with suitable blue couplers it is them possible, upon treatment with an electrophilic reactant, to obtain copies which appear black and, furthermore, have the desired actinic contrast, i.e. closely approach the silver film in their absorption properties.

It is possible to unite the selected diazo compounds and coupling components in one light-sensitive layer. But it is also possible to apply, for example, a layer from a diazo compound containing no basic amino group and an azo component coupling to give a blue dyestuff and, in another layer, to unite a diazonium compound containing a basic amino group with yellow couplers of which at least one forms color change resistant azo dyestuffs and at least one forms color changing azo dyestuffs.

The process of the invention can be performed with one- or two-component diazo-type material, i.e. the coupling components can either be added with the developer solution or be already contained in the light-sensitive layer.

The electrophilic reactant with which the developed copy is treated preferably is a strong acid. As described above, the reaction occurring with this treatment probable is a blocking of the electron pair of the basic amino group, i.e. a salt formation or quaternization at the nitrogen atom thereof. The same effect can also be achieved, of course, with other electrophilic reactants which are capable of quaternizing the basic nitrogen atom, e.g. with compounds yielding carbonium ions. In this case, however, the absorption displacement is no longer reversible as in the case of the reaction with acid protons.

The strong acid may be applied to the copy in the dissolved form or, when it is volatile, in the vaporized form. The pH value of the acid preferably should not be above about 1. It is particularly simple to put the copy in the gas space above a concentrated hydrochloric acid solution. The reaction will then be finished within few seconds.

According to another embodiment of the process, it is also possible to produce the acid in the immediate proximity of the reproduction layer by decomposition of a substance splitting off a volatile acid. Decomposition may be performed thermally or photochemically. For thermal acid production, there may be used, for example, salts of halogen hydracids with weak nonvolatile bases, hydrocarbon halides, and the like.

For photochemical acid formation, there are suitable, for example, light-sensitive organic halogen compounds, e.g. carbon tetrabromide, tribromomethylphenylsulphone, dibromobenzalacetophenone, and the like, light-sensitive diazonium slats, etc.

The acid former may be contained in the reproduction material itself or in a separate sheet which may then be passed in contact with the copy, e.g. through a thermographic reproduction device or through an exposure device.

When using light-sensitive diazonium salts as acid formers and incorporating them into the reproduction layer, probably not only the acid formed during photolysis but also the carbonium ion immediately obtained thereby may effect blocking of the electron pair of the basic amino group. This assumption is supported by the observation that, in this case, the absorption displacement may be cancelled again only partially by the action of ammonia. A stable quaternization product must have been obtained, therefore, at least partially.

The process of the invention primarily serves for the production of transparent intermediate originals, the supports of which are plastic films or transparent papers. In addition to the usual additives, the used diazo-type materials may contain, for example, ultraviolet absorbents for decreasing the gradation. Copies with a particularly good gradation of the intermediate shades are obtained, which approaches that of silver halide materials. If it is desired in special cases to operate in remission instead of operating in transmission, the process can also be performed with the use of translucent reproduction materials, e.g. of photoprinting paper.

Particularly advantageous is the use of transparent supports provided with lacquer coatings, since acid-resistant substances, e.g. polyester films, may be used as support materials. Furthermore, in the case of lacquer coating, the concentration of the starting substance in the relatively thin lacquer layer for the formation of the electrophilic substance can be kept particularly high. In the case of a multilayer construction with two lacquer layers, it is possible, for example, to apply a layer of diazo compounds and azo components coupling to give blue dyestuffs and, thereon, a second layer of diazo compounds, different components coupling to give yellow azo dyestuffs, and the starting substances for the formation of the electrophilic reactants. The layers may be on the same side or on the opposite sides of the support material.

The following examples are illustrating preferable embodiments of the process of the invention.

PREFERRED EMBODIMENTS

EXAMPLE 1

In a mixture of 25 ml. of water and 110 ml. of isopropanol, there are dissolved
  5.0 g. of citric acid,
  2.5 g. of thiourea,
  1.3 ml. of formic acid,
  5.0 g. of the zinc chloride double salt of 4-dimethylamino-benzenediazonium-chloride, and
  2.4 g. of m-acetoacetylamino-phenol.

A film of cellulose-2½-acetate is coated therewith for 10 seconds, the excess of liquid is removed, and the film is dried with air of room temperature. This film is imagewise exposed through a master to a high-pressure mercury vapor lamp, and development is then carried out with ammonia. The resulting yellow azo dyestuff has its maximum absorption at 455 nm. At 380 nm, where the light-sensitive diazo compound has its maximum absorption and maximum light-sensitivity, the absorption of the yellow azo dyestuff has already decreased to about 1/5 of the maximum value. In this spectral range, especially at 365 nm, 406 nm, and at 435 nm, the often used high-pressure mercury vapor lamps emit very intensively. The low absorption of the yellow azo dyestuff in this spectral range thus results in only a relatively low imagewise differentiation of the irradiated actinic light when making further copies, if this copy is used as an original. This particularly applied to the range of the most intensive actinic spectral line at 365 nm, where the absorption of the yellow azo dyestuff has decreased to about 1/10 of the maximum value.

The finished copy is held for some seconds above concentrated hydrochloric acid. The previously yellow azo dyestuff becomes colorless, the absorption at 455 nm disappears. Simultaneously, a new, about equally intensive, absorption band at 365 nm is created. Imagewise coverage in the range of the most intensive actinic spectral line at 365 nm is excellent, and further copies made from the copy treated in accordance with the invention thus are of substantially better contrast than before.

The contrast is effectively increased by the addition of acid cations without its being necessary to prolong the exposure times. The addition is reversible. After the action of ammonia, the original is again measured. The addition is relatively stable. For example after 2 months only 20 percent of the colorless azo dyestuff has been converted into the yellow azo dyestuff.

The short-wave spectral displacement of the absorption of yellow azo dyestuffs during the addition of electrophilic substances is observed only with such yellow azo dyestuffs as have been formed with couplers without amino groups or where amino groups in the coupler molecule are not conjugated with the chromophoric system of the azo dyestuff. Examples 2 to 7 show coupling components of which the azo dyestuffs show an absorption displacement, example 8 to 12 such as form azo dyestuffs unable of addition. The azo dyestuffs were produced, according to the statements of example 1, with equivalent quantities of the individual coupling components and 4-diethylamino-benzenediazoniumtetrafluoroborate. $\lambda 1$ indicates the wavelengths of maximum absorption of the yellow azo dyestuffs, and $\lambda 2$ the wavelengths of maximum absorption of the colorless azo dyestuffs after the action of the electrophilic substance.

Examples 2 to 12

| No. | Coupling Component | $\lambda 1$ (nm) | $\lambda 2$ (nm) |
|---|---|---|---|
| 2 | di-acetoacetyl-ethylenediamine | 440 | 363 |
| 3 | acetoacetylaniline | 453 | 371 |
| 4 | 1-phenyl-3-methyl-pyrazolone | 480 | 380 |
| 5 | 2-methylresorcinol | 470 | 380 |
| 6 | 1,3,4-resorcylic acid amide | 480 | 380 |
| 7 | 4-morpholinomethyl-2,5-dimethyl-phenol | 420 | 365 |
| 8 | 3-hydroxy-4-methyl-phenyl-urea | 470 | (470) |
| 9 | 3-hydroxy-phenyl-urea | 470 | (470) |
| 10 | 2-hydroxy-4-methyl-phenyl-urea | 440 | (440) |
| 11 | 3,5-dipiperidino-phenol | 500 | (500) |
| 12 | 3-dimethylamino-phenol | 490 | (490,360) |

In the case of examples 8 to 11, the addition of the electrophilic substance results at most in an unstable reddish discoloration disappearing within few minutes.

In the case of the azo dyestuff of example 12, even after several minutes above concentrated hydrochloric acid, an absorption decrease of only 15 percent occurs in the absorption increase at 360 nm. Under the same conditions, the absorption of the azo dyestuff of example 4 decreases at 480 nm by almost 90 percent, simultaneously with a correspondingly intensive absorption increase at 380 nm.

After coating as described in example 1, imagewise exposure to light, development in the presence of ammonia, the film is held for some seconds above concentrated hydrochloric acid. The different azo dyestuffs formed on the film yield a relatively uniform absorption between about 350 nm, and 520 nm, which slowly decreases toward s longer wavelengths. The film has a reddish-black look.

Another possibility for achieving uniform absorption over a larger spectral range is to employ in a balanced concentration ratio, in addition to a component coupling to yield a blue azo dyestuff, only one compound coupling to yield yellow azo dyestuffs, which is taken from examples 1 to 7, together with basically substituted diazonium salts and diazo compounds without a basic amino group. After imagewise exposure to light, development and treatment with an acid, an enlargement of absorption is likewise observed since an absorption band is newly formed in the near ultraviolet spectral range, whereas the absorption band in the violet spectral range maintains its position.

The described process of treatment with hydrochloric acid vapors can be technically performed in a vaporization box. This is a dense, acid-resistant box with a supply vessel for hydrochloric acid and with sealed inlet and outlet gaps. Concentrated hydrochloric acid requires a reaction time of about 5 to 10 seconds. If the material allows, it may also be bathed for 10 to 20 seconds in 1 N hydrochloric acid.

EXAMPLE 19

A unilaterally superficially saponified film of cellulose acetate is sensitized on the saponified side with an aqueous solution of 2.5 g. of 3-chloro-4-N-methyl-N-benzyl-amino)-benzene-diazoniumsulphate (Compound I), and 3.8 g. of 4-p-tolylmercapto-2,5-dimethoxy-benzenediazonium-chloride zinc chloride double salt (Compound II).

After imagewise exposure to light, a 0.2 percent aqueous neutral buffered (citrate buffer) solution of acetoacetyl aniline is applied via rollers. On the film maximum absorption of the formed azo dyestuffs is measured at 410 nm. After the action of hydrochloric acid gas for some seconds, a relative absorption maximum is measured at 378 nm and a second relative absorption maximum at 440 nm. As a whole, the absorption between 465 nm and 350 nm is rather uniform. When incorporated in the film, the azo dyestuff from diazo com- Examples 13 to 17

| No. | Coupling component | Diazonium salt | $\lambda 1$ (nm.) | $\lambda 2$ (nm.) |
|---|---|---|---|---|
| 13 | Di-acetoacetylethylenediamine | 3-(2-hydroxy-3-diethylamino-propoxy)-4-pyrrolidinobenzene-diazoniumchloride, zinc chloride double salt. | 408 | 370 |
| 14 | Acetoacetylaniline | 4-morpholino-2,5-diethoxybenzenediazoniumtetrafluoroborate | 430 | 380 |
| 15 | do | 2-dimethylamino-4,5-dimethylbenzenediazoniumchloride, zinc chloride double salt | 402 | 375 |
| 16 | Resorcinol | 3-chloro-4-diethylaminobenzenediazoniumchloride, zinc chloride double salt | 438 | 37 |
| 17 | Phloroglucinol | 3-chloro-4-diethylaminobenzenediazoniumchloride, zinc chloride double salt | 450 | 390 |

No color change occurs with the addition of electrophilic substances to azo dyestuffs from acetoacetyl aniline and the diazo compounds 4-benzoylamine-2,5-dimethoxy-benzenediazoniumchloride, 4-p-tolylmercapto-2,5-dimethoxy-benzenediazoniumchloride and naphthoquinone-(1,2)-diazide-(2)-6-sulfonic acid, sodium slat. These diazo compounds contain no basic amino groups.

EXAMPLE 18

In a mixture of 25 ml. of water and 110 ml. of isopropanol, there are dissolved
5.0 g. of citric acid
2.5 g. of thiourea
1.3 ml. of formic acid
7.0 g. of 4-diethylamino-benzenediazonium-tetrafluoroborate
2.0 g. of N,N'-diacetoacetyl-ethylenediamine
2.6 g. of 2-hydroxy-4-methyl-phenylurea, and
2.3 g. of 2-hydroxy-3-naphthoic acid-(2-hydroxy-ethyl)-amide.

pound I and from acetoacetyl aniline has its maximum absorption at 402 nm and, after the addition of an electrophilic substance, at 374 nm. The azo dyestuff from diazo compound II with acetoacetyl aniline has its maximum absorption at 428 nm (flat double maximum) and is resistant to color change.

EXAMPLE 20

In a mixture of 25 ml. of water and 110 ml. of isopropanol, there are dissolved
5.0 g. of citric acid
2.5 g. of thiourea
1.3 ml. of formic acid
3.0 g. of 4-dimethylamino-benzenediazoniumchloride, zinc chloride double salt (Compound III),
4.5 g. of 4-benzoylamino-2,5-diethoxy-benzene-diazoniumchloride, zinc chloride double salt (Compound IV), as well as
6.5 g. of acetoacetyl aniline.

Coating is performed as described in example 1 and followed by imagewise exposure to light and development with ammonia. In the image areas, maximum absorption of the formed azo dyestuffs is measured at 440 nm. Subsequently, the film is held for some seconds above concentrated hydrochloric acid. A relative absorption maximum is then measured at 374 nm and a second relative absorption maximum at 440 nm. As a whole, the absorption between 350 nm and 470 nm is rather uniform.

After coupling, maximum absorption of films produced only with diazonium salt IV and acetoacetyl aniline is measured at 435 nm, the azo dyestuff in this case proving to be resistant to color change.

EXAMPLE 21

A sheet of transparent paper impregnated with a 5 percent solution of carbon tetrabromide in acetone is laid onto a diazo-type reproduction material according to example 1, which has been imagewise exposed to a high-pressure mercury vapor lamp and then developed, and the whole is exposed to light.

When making further copies on diazo-type reproduction papers, the treated copy yields copies of a markedly better contrast than before treatment since a substantial part of the yellow azo dyestuff absorbs the light of a shorter wave length. Equally good results are obtained when, instead of exposing them to light, both sheets are heated in contact up to 1 minute to 80° to 100° C.

It is also possible to add the compounds of the coating solution which split off acids in the light together with the diazo compound and the coupling components to coat cellulose acetate film therewith, to expose imagewise to light, to develop, and to expose once more to light without a master. Particularly halogen hydracids are formed during photolysis of many organic halogen compounds.

When correspondingly repeating examples 2 to 7 and 3 to 20, similar results as stated there are obtained when there is no after-treatment with hydrochloric acid gas but the halogen hydracid is directly produced in the light-sensitive layer or in the layer support.

EXAMPLE 22

In 100 ml. of methyl glycol, there are dissolved
2.5 g. of citric acid
1.3 g. of thiourea
2.2 g. of the coupling component of example 2
2.5 g. of the diazonium salt of example 2 and the stated quantity of the halogen compounds indicated below, and a cellulose triacetate film is soaked therewith for 3 minutes, the film is dried with air of room temperature, which is followed by imagewise exposure to light and development in the presence of ammonia.

| Photochemical Acid Former | Quantity (g) |
| --- | --- |
| tribromomethyl-phenyl-sulphone | 0.5 |
| ($\alpha,\beta$-dibromo-phenethyl)-phenyl-ketone | 1.0 |
| 1,3,5-tribromomethyl-triazine | 1.0 |
| tribromomethyl-(3-nitro-phenyl)-ketone | 0.5 |
| phenanthrenequinone-chlorindene-dioxene(1:1 adduct) | 2.0 |
| phenanthrenequinone-vinylchloride-dioxene (1:1 adduct) | 2.0 |

Imagewise exposure to light is followed by a second intensive exposure to light without a master. In all stated cases, the second exposure to light markedly improves the contrast when making further copies, due to partial displacement of the absorption of the azo dyestuffs to the shorter-wave range.

It is also possible to apply the photochemical acid formers separately from the layer containing the diazo compound and the coupling components to the same support material, e.g. in the case of a porous support material by a simple back coating. In this case, second exposure to light advantageously is performed also on the back side.

EXAMPLE 23

Diazo-type reproduction material produced according to example 1 is imagewise exposed to light and developed with ammonia. The thus prepared film is again coated for 30 seconds with a concentrated solution of the same diazonium slat in a 1:1 solvent mixture of isopropanol and water and dried. This coating is performed without any quality loss of the developed image since the formed azo dyestuff is very scarcely soluble in the used solvent mixture in contradistinction to the diazonium salt which is very readily soluble. The material is subsequently again exposed to light without a master. After the second exposure to light, the contrast is markedly increased on the following copies because of the partial displacement of the azo dyestuffs to the shorter-wave range.

Spectral displacement of the azo dyestuffs is rather stable, after two months no measurable retrogression could be observed. With the action of ammonia, the displacement of the azo dyestuff absorption is partially cancelled again.

The diazo-type reproduction material may also be provided with an excess of diazo compound which is relatively large with respect to the quantity of coupling component. As usual, after imagewise exposure to light and development, the diazonium salt not used during development is decomposed during a second exposure to light without a master. Partial displacement of the azo dyestuff absorption in the image areas to the shorter wave range occurs, the contrast in the production of further copies being improved thereby. When using diazonium slats of different chemical constitutions, e.g. diazonium salts of examples 13 to 17, the absorption maxima of which, depending on the individual structure, are between 380 nm and 450 nm, the coupling capacities of which furthermore strongly differ, e.g. the diazonium salt of example 16 couples markedly more rapidly than that of example 1—the procedure may be as follows: Imagewise exposure to light with filtered light is carried out in a manner such that the more rapidly coupling diazonium slat is preferably decomposed, this being followed by development and exposure to light without a master and without an optical filter.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. A process for the production of diazo-type intermediate original copies comprising:
    a. providing diazo-type reproduction material comprising a translucent support and a light-sensitive coating thereon comprising a mixture of:
        1. a first diazonium compound selected from the group consisting of light-sensitive benzene diazonium compounds having a basic amino group wherein the nitrogen atom thereof is directly attached to the benzene nucleus at either the para or ortho position relative to the diazonium radical, said basic amino group being a secondary or tertiary amino group which is further substituted by a substituent from the group consisting of alkyl, cycloaklyl, aralkyl radicals and radicals which form a 5 or 6 membered saturated hetrocyclic ring with said nitrogen atom of said basic amino group, and
        2 a second diazonium compound selected from the group consisting of light-sensitive benzene diazonium compounds devoid of basic amino nitrogen atoms attached directly to the benzene nucleus;
    b. exposing said material imagewise to light for a time sufficient to imagewise decompose said diazonium compounds;

c. combining undecomposed portions of said diazonium compounds with at least tone azo coupler compound selected from group consisting of phenol couplers devoid of amino nitrogen atoms attached directly to the benzene nucleus and enol couplers, thereby imagewise developing characteristic azo dyes; and d. contacting said azo dye image with an electrophilic reactant selected from the group consisting of solutions and vapors of strong acids, thereby causing a color and wavelength absorption shift in the azo dye derived from said first diazonium compound and said azo coupler compound to yield an image with the azo dye derived from second diazonium compound and said azo coupler compound of mixed dyes absorptive of light in a broad wavelength range from the near ultraviolet to the shorter wavelengths of the visible spectrum.

2. The process according to claim 1 wherein said light-sensitive coating includes said azo coupler compound, and said combining step comprises effecting an alkaline environment conductive to the formation of sad dyes.

3. The process according to claim 1 wherein said combining step comprises contacting said undecomposed compounds with a developer comprising said azo coupler compound.

4. The process according to claim 1 wherein the step of contacting said azo dye images with said electrophilic reactant comprises exposing to light a photochemical acid former situated proximate said azo dye images.

5. A process for the production of diazo-type intermediate original copies comprising:

a. providing copy sheet material comprising a translucent support and a coating thereon of a composition comprising:

1. a diazonium compound selected from the group of first light-sensitive benzene diazonium compounds each having a basic amino group wherein the nitrogen atom thereof are directly attached to the benzene nucleus at either the para or ortho position relative to the diazonium radical, said basic amino group being a secondary or tertiary amino group which are further substituted by a substituent from the group consisting of alkyl, cycloalkyl, aralkyl radicals and radicals which form a 5 or 6 membered saturated heterocyclic ring with said nitrogen atom of said amino group, and 2. an azo coupler compound selected from the group consisting of first azo couplers, which are phenol coupler compounds devoid of amino nitrogen atoms attached directly to the benzene nucleus or enol coupler compounds, and 3. at least one compound selected from the group consisting of second light-sensitive benzene diazonium compounds devoid of basic amino nitrogen atoms attached directly to the benzene nucleus, and second azo couplers which are phenol coupler compounds having amino groups wherein the nitrogen atoms thereof are directly attached to the benzene nucleus;

b. exposing said material imagewise to light;

c. developing said exposed material to form characteristic azo dye image; and d. contacting said azo dye image with an electrophilic reactant selected from the group consisting of solutions and vapors of strong acids, thereby causing a color and wavelength absorption shift in the azo dye derived from said first diazonium compounds and said first azo couplers to yield an image with the azo dye derived from either said second diazonium compounds and said first azo couplers or said first diazonium compounds and said second azo couplers of mixed dyes absorptive of light in the broad wavelength range from the near ultraviolet to the shorter wavelengths of the visible spectrum.

* * * * *